United States Patent [19]

Maughan

[11] Patent Number: 5,713,686
[45] Date of Patent: Feb. 3, 1998

[54] PREVAILING-TORQUE ADJUSTING SLEEVE

[75] Inventor: Garth B. Maughan, Delta, Ohio

[73] Assignee: Dana Corporation, Toledo, Ohio

[21] Appl. No.: 533,629

[22] Filed: Sep. 25, 1995

[51] Int. Cl.⁶ .................................................. F16B 7/06
[52] U.S. Cl. ........................... 403/46; 403/43; 403/274; 411/283
[58] Field of Search ................... 403/43–48, 274, 403/277, 279, 281, 282; 411/284, 283

[56] References Cited

U.S. PATENT DOCUMENTS

| | | | |
|---|---|---|---|
| 197,509 | 11/1877 | Abbott. | |
| 702,254 | 6/1902 | Stockman. | |
| 1,415,658 | 5/1922 | Lane. | |
| 1,523,393 | 1/1925 | Britton. | |
| 1,870,380 | 8/1932 | Peters et al.. | |
| 2,009,090 | 7/1935 | Little | 403/46 X |
| 2,452,192 | 10/1948 | Hosking | 151/21 |
| 2,596,885 | 5/1952 | Booth | 287/125 |
| 2,772,102 | 11/1956 | Webb | 285/334 |
| 2,897,867 | 8/1959 | Torre | 151/21 |
| 2,923,339 | 2/1960 | Skidmore | 151/21 |
| 3,065,983 | 11/1962 | Flumerfelt | 287/60 |
| 3,208,494 | 9/1965 | Skidmore | 151/21 |
| 3,229,999 | 1/1966 | Storch | 287/60 |
| 3,360,890 | 1/1968 | Dooley, Jr. | 51/378 |
| 3,496,800 | 2/1970 | Brezinski | 74/586 |
| 3,498,652 | 3/1970 | Cass | 287/60 |
| 3,501,828 | 3/1970 | Schultz | 29/421 |
| 3,551,999 | 1/1971 | Gutmann | 403/274 X |
| 3,583,052 | 6/1971 | Herbenar et al. | 29/175 |
| 3,889,511 | 6/1975 | Bayle | 72/370 |
| 3,907,017 | 9/1975 | Stanwick | 151/22 |
| 3,989,394 | 11/1976 | Ellis | 403/46 |
| 4,093,388 | 6/1978 | MacArthur | 403/46 |
| 4,111,568 | 9/1978 | Wing | 403/2 |
| 4,461,063 | 7/1984 | Patton | 29/175 |
| 4,629,222 | 12/1986 | Dearden et al. | 285/332.4 |
| 5,123,793 | 6/1992 | Bonstein | 411/310 |

FOREIGN PATENT DOCUMENTS

| | | |
|---|---|---|
| 483572 | 2/1970 | Switzerland. |
| 0385095 | 8/1973 | U.S.S.R.. |
| 0765535 | 9/1980 | U.S.S.R.. |
| 840578 | 7/1960 | United Kingdom. |
| 1244874 | 9/1971 | United Kingdom. |

*Primary Examiner*—Harry C. Kim
*Attorney, Agent, or Firm*—Rader, Fishman & Grauer PLLC

[57] ABSTRACT

An improved adjusting sleeve for connecting together a pair of opposite, generally-collinear threaded rods, as may be found in automotive front-end suspensions, includes an elongate, tubular body. While the sleeve may comprise differing numbers of surfaces prior to and subsequent to a longitudinally-nonuniform crimping operation performed on each of its longitudinal ends, in a preferred embodiment the sleeve forms a modified octagon when viewed in lateral cross-section, including six wrenching flats extending along its entire length. A longitudinally-nonuniform crimping operation serves to radially inwardly displace the longitudinal end portions of each of the full-length diametrical crimping flats which otherwise complete the body's octagonal shape in lateral cross-section. The resulting localized deformation of the bore formed in each of the body's longitudinal ends achieves a consistent a prevailing torque without inducing connector "wobble." The improved adjusting sleeve has a low profile to permit its use where space is very limited, and its full-length standard wrenching flats facilitates adjustment of the connector assembly.

15 Claims, 1 Drawing Sheet

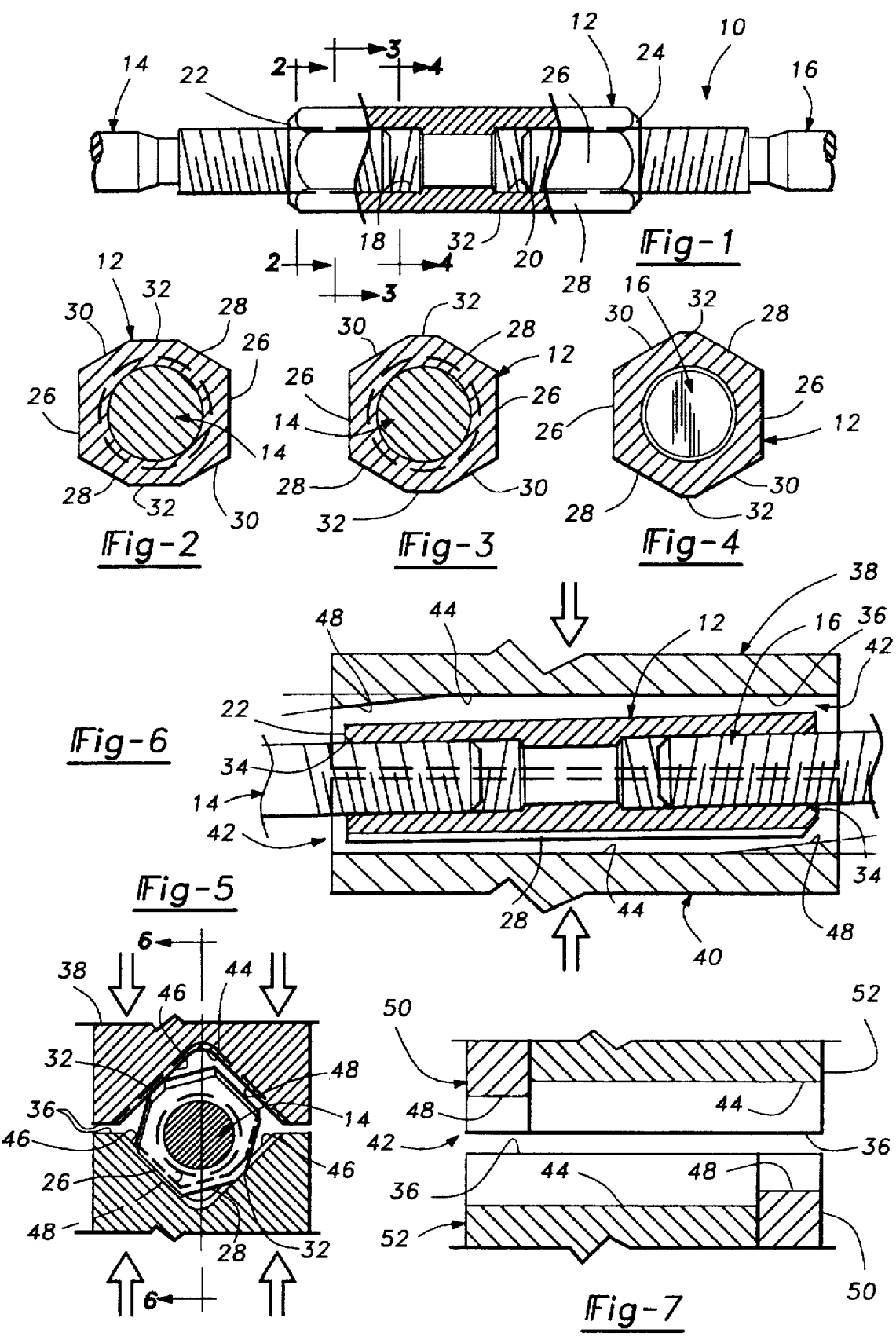

PREVAILING-TORQUE ADJUSTING SLEEVE

FIELD OF THE INVENTION

The present invention relates to internally-threaded connecting members, also known as adjusting sleeves, tubular couplings and turnbuckles, and, more specifically, to self-locking connecting members as might be useful in connecting together components within the front-end suspension of a motor vehicle, particularly where the space available for adjusting the separational distance between the thus-connected components is limited and ease of adjustment is at a premium.

BACKGROUND OF THE INVENTION

The prior art teaches myriad single-piece and multiple-piece connecting members for adjustably connecting two opposed, roughly-collinear, externally-threaded components or rods. Generally speaking, known single-piece connecting members typically comprise an elongate body having generally-cylindrical bores formed in each of the body's longitudinal ends. Depending upon the specific application for which the connecting member is to be used and, particularly, the degree of longitudinal adjustment it must necessarily afford, the connecting member's bores (and the complementary threaded rods with which they are respectively mated) are provided with threads of like or different nominal pitch and of like or opposite hand.

Typically, prior art connecting members include means for "locking" the connecting member relative to one or both of the threaded rods. For single-piece connecting members, a preferred locking means involves the creation of an "interference fit" between one or both of the connecting member's bores and the threaded rods with which they are respectively mated, thereby creating a "prevailing torque" which resists relative rotation of the connecting member and the rods.

Under a preferred prior art approach, this interference fit is obtained by deforming one or both of the connecting member's bores along at least one longitudinally-discrete section thereof to provide an axially- and circumferentially-localized reduction in thread pitch, root or crest diameter. These deformed or "distorted" thread areas operate to bind against the otherwise complementary external threads of the rods to provide the requisite prevailing torque.

In practice, the deformed thread areas are obtained as through formation of one or more indentations or depressions in the connecting member's outer surface near, but not at, each of its longitudinal ends either before or after the rods are inserted and advanced into the connecting member's bores. Such indentations or depressions are nominally formed as through use of punches or, most preferably, by crimping the connecting member between opposed dies (again, either before or after the threaded rods are inserted and advanced into the connecting member's bores).

Often, known crimping operations transform these longitudinal sections into an elliptical shape in cross-section, with a relative tightening of the contact between the connecting member and the rods along the ellipse's minor axis, and a relative loosening of such contact along the ellipse's major axis. This resulting elliptical cross-sectional shape, in turn, is likely to introduce unwanted and possibly deleterious "wobble" into the connector assembly.

The prior art methods most likely to provide a consistent prevailing torque characteristic while preventing such connector "wobble" require that the indentations or depressions be both axially- and circumferentially-spaced about the exterior surface of the connecting member. This typically necessitates multiple crimping operations, along with repeated translation and/or rotation of the connecting member/assembly relative to the crimping dies between such crimping operations, thereby increasing its cost and the relative difficulty of manufacturing the connecting member.

As a variation on this theme, under another known method, the localized deformation is generated by forming a pair of spiral or helical grooves in the connecting member's outer surface along longitudinal sections intermediate the connecting member's intermediate ends. Specifically, under this method, the connecting member is positioned between two parallel-spaced raised dies, whereupon the dies are displaced in opposite directions parallel to the die faces. Unfortunately, the "rolling" of the connector assembly between the die faces necessitates use of a generally cylindrical exterior surface, thereby inherently limiting the extent to which the connecting member's exterior surface may be provided with suitable wrenching "flats."

Indeed, in order to facilitate adjustment of the relative distance between the two threaded rods which are joined using the connecting member, known connecting members are preferably given so-called "standard" wrenching flats forming either a rectangle or hexagon when viewed in lateral cross-section. Typically, these wrenching flats are located on the connecting member at some distance from the areas experiencing localized deformation.

However, in one prior art single-piece connecting member having wrenching flats extending along the connecting member's entire length, a central portion of each of a diametrical pair of longitudinal edges-themselves defined by adjacent wrenching flats-is deformed slightly radially inwardly to provide the requisite localized thread deformation. Unfortunately, since the connecting member is intentionally crimped only at or near its longitudinal center, the prevailing torque characteristic varies with the degree of advancement of each threaded rod into the connecting member. As a further disadvantage, since the longitudinal edges themselves define the thickest part of the connecting member's radial wall, a greater force is required to inwardly deform such edges, thereby producing narrowly-localized deformation, a less predictable prevailing torque characteristic, and a greater likelihood of correlative expansion of the resulting elliptical thread pitch's major diameter.

Thus, what is needed is a reusable, one-piece, low-profile prevailing-torque connecting member or adjusting sleeve for joining together two opposed threaded rods, as might be found in automotive and truck steering systems, which provides consistent prevailing torque and nominally-hexagonal wrenching flats along its entire length to facilitate adjustment in close-quarters, with improved manufacturability.

SUMMARY OF THE INVENTION

In accordance with the present invention, a connecting member or sleeve for adjustably joining together two opposed threaded elements or rods includes an elongate body having a threaded bore formed in each of the body's longitudinal ends, each of which is adapted to receive and threadingly engage a respective one of the rods. The exterior longitudinal surface of the elongate body includes at least three pairs of substantially planar diametrical surfaces extending from the first end of the body to the second end. A first pair of surfaces is orthogonal to a second pair of surfaces, wherein a first portion of one of the second pair of surfaces at the first end of the body is displaced diametrically toward the other of the second pair of surfaces to achieve a first diametrical spacing between the second pair of surfaces at the first end of the body. The first diametrical spacing is less than a second diametrical spacing between the second pair of surfaces at a point intermediate the first and second ends of the body.

In a preferred embodiment, four pairs of full-length diametrical flats forming in a modified octagon when viewed in lateral cross-section. Three pairs of flats cooperate to provide two diametrical sets of adjacent wrenching surfaces otherwise disposed at 120 degrees to one another. The diametric spacing of each pair of wrenching flats remains substantially constant over the entire length of the sleeve, thereby providing standard wrenching surfaces along the sleeve's entire length.

As for the remaining fourth pair of diametrical flats, each of these "crimping flats" has its longitudinal end portions permanently displaced or "crimped" diametrically toward the other crimping flat to achieve a desired prevailing torque characteristic. Stated another way, unlike the diametrical spacing between pairs of diametrical wrenching flats, the diametrical spacing between the crimping flats—and, hence, the thread pitch diameter of each of the sleeve's bores along portions thereof proximate with the crimping flats—varies along the length of the sleeve such that the crimping flats are more closely spaced near the sleeve's longitudinal ends than along the central portion of the sleeve, with the crimping flats being most closely spaced at each of the sleeve's longitudinal ends. Indeed, in the preferred embodiment, the "crimped" portions of each crimping flat extends longitudinally from each end of the sleeve no farther than the minimum depth to which each rod is advanced into its respective bore during normal use of the resulting connector assembly. Still further, under the invention, the diametrical spacing between the crimping flats at one end of the sleeve may differ from the diametrical spacing between the crimping flats at the other end of the sleeve, thereby providing different levels of interference fit at each of the sleeve's ends. However, it is noted that the diametrical spacing between the pair of crimping surfaces will always exceed, at all points along the length of the sleeve, the nominal (or even maximal) diametrical spacing between the largest pair of diametrical wrenching surfaces.

The connecting member or "adjusting sleeve" of the present invention thus provides an interference fit between its longitudinal bores and the mating rods only at and near the longitudinal ends of the sleeve and, preferably, only to a depth within each bore corresponding to the minimum effective depth of each rod therein (i.e., corresponding to the maximally-adjusted effective length of the resulting connector assembly). In this manner, the interference fit and, hence, the effective clamping torque are more evenly distributed along a length of each bore and rod, respectively, to achieve a prevailing torque characteristic that remains essentially constant notwithstanding the degree to which the rods are further advanced into the sleeve during adjustment of the connector assembly.

In accordance with a preferred method of making the connecting member or adjusting sleeve of the present invention, each externally-threaded rod is inserted and threadably advanced to a predetermined minimum depth into its respective complementary, nominally-cylindrical threaded bore in a sleeve blank whose exterior surface has three pairs of diametrical wrenching flats and a pair of diametrical crimping flats forming a modified octagon when viewed in lateral cross-section. Significantly, the diametrical spacing between respective diametrical pairs of flats remains substantially constant along the entire length of the sleeve blank, with the diametrical spacing between the two crimping flats being greater than the diametrical spacing between any of the pairs of wrenching flats.

The resulting assembly is then crimped between a pair of dies to effect permanent diametrical displacement of only the longitudinal ends of the crimping flats. More specifically, the crimping flats, and only the crimping flats, are pressed by opposed die surfaces towards one another only at the longitudinal ends of the sleeve blank while the longitudinal center of the sleeve blank either remains undisturbed or is minimally crimped. As noted above, in accordance with the present invention, the amount by which the crimping flats are diametrically displaced at each longitudinal end of the sleeve during the crimping operation may differ so as to provide different levels of interference fit at each end of the sleeve.

In accordance with the present invention, during the crimping operation, the two crimping flats operate to decrease the die pressure required to obtain the desired level of interference fit between the sleeve's bores and the rods while further serving to distribute the interference fit between the sleeve's bores and the rods more evenly than can be achieved with known connecting members having full-length wrenching flats, thereby providing a smooth, uniform prevailing torque characteristic.

In accordance with another feature of the present invention, the crimping dies used to permanently diametrically displace the longitudinal ends of the sleeve blank's crimping flats preferably include opposed die surfaces having aligned V-shaped channels, the depth of the channels varying along the portion thereof making contact one or the other of the sleeve's longitudinal ends so as to produce maximal relative crimping of the sleeve at its longitudinal ends while the central portion of the sleeve either remains undisturbed or is minimally crimped thereby. Under the present invention, the variable depth V-shaped channels of the opposed die surfaces is obtained as by forming a tapered channel in the surface of a unitary die or, alternatively, by abutting two or more dies, each having a V-shaped channel of constant depth formed therein. And, by varying the relative depths of the V-shaped channels formed in the opposed die surfaces, the amount of diametrical displacement of the crimping flats at each end of the sleeve for a given die displacement is precisely controlled.

BRIEF DESCRIPTION OF THE DRAWINGS

Referring to the drawings, wherein like reference numerals are used to designate like elements in each of the several figures, FIG. 1 is a side elevational view of a connector assembly incorporating an adjusting sleeve in accordance with the present invention;

FIG. 2 is a view in cross-section of the connector assembly along line 2—2 of FIG. 1;

FIG. 3 is a view in cross-section of the connector assembly along line 3—3 of FIG. 1;

FIG. 4 is a view in cross-section of the connector assembly along line 4—4 of FIG. 1;

FIG. 5 is a view in cross-section of the connector assembly similar to that of FIG. 2 upon insertion of the connector assembly between a pair of crimping dies (the latter being shown in partial cross-section);

FIG. 6 is a longitudinal view in cross-section of the connector assembly and crimping dies along line 6—6 of FIG. 5; and FIG. 7 is a longitudinal view in cross-section of an alternate die set for use in accordance with the present invention.

DETAILED DESCRIPTION OF THE PREFERRED EMBODIMENT(S)

Referring to the drawings, an exemplary adjustable connector assembly 10 is shown in side elevation in FIG. 1 as comprising a tubular adjusting sleeve 12 which receives an externally-threaded rod 14,16 in a complementary threaded bore 18,20 formed in each of the sleeve's longitudinal ends 22,24. The nominal thread pitch, pitch diameter and hand of the mating rods 14,16 and bores 18,20 are selected in a manner known in the art so as to provide the connector assembly 10 with a desired range of longitudinal adjustment upon rotation of the sleeve 12 relative to the rods 14,16. Often, the nominal thread pitch and pitch diameter of both bores 18,20 are the same, with the first bore 18 having a thread of opposite hand to that of the second bore 20.

As may be readily appreciated with reference to FIGS. 2–4, the sleeve's exterior is defined by four pairs 26,28,30, 32 of diametrical, substantially planar surfaces or "flats" extending along the entire length of the sleeve 12. More specifically, the sleeve's exterior includes three pairs 26,28, 30 of diametrical flats defining wrenching surfaces extending along the sleeve's entire length, with the included angles between adjacent wrenching flats 26,28,30 each being about 120 degrees. The fourth pair 32 of diametrical flats extending along the entire length of the sleeve 12 define a pair of diametrical crimping surfaces thereon. In the preferred embodiment illustrated in the Figures, the crimping flats 32 are disposed at about a 90 degree angle in lateral cross-section with respect to the largest pair 26 of wrenching flats.

Together, the wrenching flats 26,28,30 and crimping flats 32 define the sleeve's exterior as a modified octagon when viewed in lateral cross-section, with the six wrenching flats 26,28,30 positioned to receive a standard wrench. As will be described more fully below, the "standard" diametrical spacing between each pair 26,28,30 of wrenching flats remains substantially constant along the entire length of the sleeve 12, while the diametrical spacing between the pair 32 of crimping flats varies in a predetermined manner along the length of the sleeve 12. Significantly, however, the diametrical spacing between the sleeve's pair 32 of crimping flats will always exceed the diametrical spacing between the largest pair 26 of wrenching flats (the latter preferably remaining wholly undisturbed during any diametrical crimping of the crimping flats 32).

Returning to FIGS. 2–4, the crimping flats 32 on the sleeve 12 are diametrically displaced toward one another only at and near the sleeve's longitudinal ends 22,24 so as to generate circumferentially-localized variations in the nominal pitch diameter of the longitudinally-outermost threads within the each of the sleeve's bores 18,20. The diametrical displacement of the crimping flats 32 at each longitudinal end 22,24 of the sleeve 12 provides an interference fit between each of the sleeve's bores 18,20 and the rods 14,16 respectively advanced therein.

Indeed, in a preferred embodiment, the diametrically displaced or "crimped" portions of the sleeve's crimping flats 32 extend longitudinally from each end of the sleeve no farther than the minimum depth to which each rod 14,16 is advanced into its respective bore 18,20 during normal use of the resulting connector assembly 10. Moreover, the amount of diametrical displacement of the longitudinal end portions of the crimping flats 32 proximate with the ends 22,24 of the sleeve 12 preferably varies inversely with increasing distance from the sleeve's nearest longitudinal ends 22,24.

The variably diametrically displaced crimping flats 32 of the present sleeve 12 provide a controlled and accurate interference between the sleeve's bores 18,20 and each of the rods 14,16 advanced there into, such that the resulting connections are made consistently to lock together and resist loosening from vibration. And, in the preferred embodiment, since the diametrical displacement of the crimping flats 32 (and the correlative deformation of the inner threads of the sleeve's bores 18,20) extends longitudinally no farther than the minimum depth to which the rods 14,16 are advanced into the sleeve 12, the rods 14,16 fully engage the deformed portions of each bore 18,20, no matter how much farther the rods 14,16 are advanced into the sleeve 12, thereby ensuring a consistent prevailing torque characteristic.

Additionally, the elliptical deformation of the sleeve's bore 18,20 maintains the continuity of the bore's internal threads and, hence, avoids galling of the rods 14,16 upon insertion and advancement into the sleeve's bores 18,20. Consequently, the rods 14,16 may be repeatedly adjusted, removed and/or replaced without impairing the sleeve's prevailing torque characteristic or otherwise damaging either the sleeve's threaded bores 18,20 or the external threads of the rods 14,16. As is best seen in FIG. 6, the entrance to each of the sleeve's bores 18,20 is preferably also provided with a chamfer 34 to facilitate insertion of its respective threaded rod 14,16 thereinto.

In accordance with a preferred method of making the present adjusting sleeve 12, a sleeve "blank" is provided as by extruding a tube over a mandrel to obtain a tubular sleeve blank having a controlled inside diameter. With a generally-cylindrical bore thus extending longitudinally through the entire length of the sleeve blank, threads of opposite hand are then formed in the bore at each of the blank's longitudinal ends 22,24, as by rotating and advancing a tap thereinto while otherwise fixedly securing the sleeve blank against rotation about its longitudinal axis. A chamfer 34 is thereafter preferably formed at the entrance of each resulting threaded bore 18,20 to facilitate subsequent insertion of its respective threaded rod 14,16 thereinto, either during original assembly or subsequently, as during reassembly of the connector assembly 10.

In accordance with a preferred method of making the adjusting sleeve 12, the rods 14,16 are engaged and advanced to a desired depth into the sleeve's threaded bores 18,20 prior to insertion of the sleeve 12 between the opposed surfaces 36 of a pair of crimping dies 38,40, as shown in FIG. 5 and 6. The opposed face 36 of each crimping die 38,40 includes a V-shaped channel 42 of varying depth. Specifically, each channel 42 includes an apex 44 and two side walls 46 generally disposed at a 45 degree angle with respect to the direction of relative die movement (indicated generally by the vertical arrows in FIGS. 4 and 5).

A portion 48 of the channel 42 in each opposed die surface 36 is raised, i.e., is of lesser depth, relative to the rest of the channel 42, with the raised portion 48 of each die's channel 42 being positioned so as to engage opposite longitudinal ends 22,24 of the sleeve 12 upon relative vertical movement of the dies 38,40. Thus, when the assembly is inserted between the two dies 38,40, one of the side walls 46 of the lower crimping die's channel 42 serves to support one of the wrenching flats 26 while the other of the lower die channel's side walls 46 supports one of the sleeve's crimping flats 32.

The apex 44 of the upper die's channel 42 is also vertically aligned with the apex 44 of the lower die's channel 42. In this manner, upon relative vertical movement of the upper die 38 towards the lower die 40, only one of the side walls 46 of the upper die's channel 42 will make contact with the other of the sleeve's crimping flats 32 and, then, preferably only to permanently diametrically displace longitudinal end portions of the crimping flats 32. The diametrical spacing between the crimping flats 32 along the central section of the sleeve 12 will thus remain at its nominal, "as-extruded" dimension.

In the preferred method of making the adjusting sleeve 12, the raised portion 48 of the channel 42 of each die 38,40 is provided with a gradual taper as seen in FIG. 6, such that resulting permanent diametrical displacement of each crimping flat 32 upon crimping the connector assembly 10 varies inversely with increasing distance from the sleeve's proximate longitudinal end 22,24. Alternatively, the raised portion 48 of the channel 42 of each die 38,40 may be defined through use of two or more abutting die sections 50,52, each having a V-shaped channel 42 formed therein of uniform but nominally-different depth. A die set comprising such die sections 50,52 and providing a "stepped" variable-depth channel 42 for use with the present invention is shown in longitudinal cross-section in FIG. 7.

While the preferred embodiments of the invention have been disclosed, it should be appreciated that the invention is susceptible of modification without departing from the spirit of the invention or the scope of the subjoined claims. For example, while the exemplary sleeve illustrated in FIG. 1 includes a central bore extending longitudinally through its entire length, the present invention contemplates use of a "sleeve," i.e., an elongate body, having a solid longitudinal center. Similarly, the crimping operation may be performed on the sleeve 12 prior to insertion and advancement of either or both of the threaded rods 14,16 into their respective bores 18,20. Further, while the preferred embodiment recites the use of a sleeve having a modified octagonal shape, it is possible to have other shapes. For example, the sleeve may be a modified hexagon or decagon.

I claim:

1. A prevailing-torque connecting member for adjustably joining together a pair of substantially-collinear externally-threaded elements, said connecting member comprising:
    an elongate body having a first threaded bore formed in a first longitudinal end of said body adapted to receive one of the externally-threaded elements, a second threaded bore formed in a second longitudinal end of said body adapted to receive the other of the externally-threaded elements, and at least three pairs of substantially planar diametrically opposing surfaces extending from the first end of said body to the second end of said body,
    a first pair of surfaces being orthogonal to a second pair of surfaces, wherein a first portion of one of the second pair of surfaces at the first end of said body is displaced diametrically toward the other of the second pair of surfaces to achieve a first diametrical spacing between the second pair of surfaces at the first end of said body, wherein the first diametrical spacing is less than a second diametrical spacing between the second pair of surfaces at a point intermediate the first and second ends of said body.

2. The connecting member of claim 1, wherein said first and second threaded bores have internal threads of opposite hand.

3. The connecting member of claim 1, wherein a diametrical spacing between the first pair of surfaces remains substantially constant along the entire length of said body.

4. The connecting member of claim 1, wherein the first diametrical spacing between the second pair of surfaces exceeds a diametrical spacing between the first pair of surfaces.

5. The connecting member of claim 1, having four pairs of substantially planar diametrically opposing surfaces.

6. The connecting member of claim 5, wherein a third pair of opposing surfaces and a fourth pair of opposing surfaces share a common included angle value with respect to one of said first and said second pair of surfaces.

7. The connecting member of claim 6, wherein said included angle value is about 120 degrees.

8. A prevailing-torque connecting member for adjustably joining together a pair of substantially-collinear externally-threaded elements, said connecting member comprising:
    an elongate body having a first threaded bore formed in a first longitudinal end of said body adapted to receive one of the externally-threaded elements, a second threaded bore formed in a second longitudinal end of said body adapted to receive the other of the externally-threaded elements, and four pairs of substantially planar diametrically opposing surfaces extending from the first end of said body to the second end of said body;
    a first pair of surfaces meeting a second pair of surfaces along a first pair of diametrical longitudinally-extending edges, each with an included angle of about 120 degrees, the first pair of surfaces meeting a third pair of surfaces along a second pair of diametrical longitudinally-extending edges, each with an included angle of about 120 degrees; and
    wherein a first portion of one of a fourth pair of surfaces at the first end of said body is displaced diametrically toward the other of the fourth pair of surfaces to achieve a first diametrical spacing between the fourth pair of the surfaces at the first end of said body, wherein the first diametrical spacing is less than a second diametrical spacing between the fourth pair of surfaces at a point intermediate the first and second ends of said body.

9. The connecting member of claim 8, wherein a second longitudinal end portion of the one of the fourth pair of surfaces at the second end of said body is diametrically displaced towards the other of the fourth pair of surfaces.

10. The connecting member of claim 9, wherein the diametrical spacing between the first pair of surfaces remains substantially constant along the entire length of said body.

11. The connecting member of claim 10, wherein the first diametrical spacing between the fourth pair of surfaces exceeds the diametrical spacing between the first pair of surfaces.

12. The connecting member of claim 8, wherein said first and second threaded bores have internal threads of opposite hand.

13. A prevailing-torque connecting member for adjustably joining together a pair of substantially-collinear externally threaded elements, said connecting element comprising:
    an elongate body having a first threaded bore formed in a first longitudinal end of said body adapted to receive one of the externally-threaded elements, a second threaded bore formed in a second longitudinal end of said body adapted to receive the other of the externally-threaded elements, at least one pair of substantially planar diametrically opposing surfaces extending from the first end of said body to the second end of said body; and a first portion of one of said pair of surfaces at the first end of said body being displaced diametrically toward the other of said pair of surfaces to achieve a first diametrical spacing between said pair of surfaces at the first end of said body, wherein the first diametrical spacing is less than a second diametrical spacing between said pair of surfaces at a point intermediate the first and second ends of said body.

14. The connecting member of claim 13, wherein said member includes at least three pairs of said opposing surfaces.

15. The connecting member of claim 13, wherein a second pair of surfaces is orthogonal to said pair of surfaces.

* * * * *